(12) United States Patent
Boucher

(10) Patent No.: US 9,202,330 B2
(45) Date of Patent: Dec. 1, 2015

(54) PORTABLE OBJECT INCLUDING A DISPLAY AND APPLICATION FOR CARRYING OUT ELECTRONIC TRANSACTIONS

(75) Inventor: Daniel Boucher, Quebec (CA)

(73) Assignee: GEMALTO SA, Meudon (FR)

( * ) Notice: Subject to any disclaimer, the term of this patent is extended or adjusted under 35 U.S.C. 154(b) by 80 days.

(21) Appl. No.: 13/131,435

(22) PCT Filed: Nov. 30, 2009

(86) PCT No.: PCT/EP2009/066034
§ 371 (c)(1),
(2), (4) Date: Aug. 5, 2011

(87) PCT Pub. No.: WO2010/061002
PCT Pub. Date: Jun. 3, 2010

(65) Prior Publication Data
US 2011/0284633 A1    Nov. 24, 2011

(30) Foreign Application Priority Data

Nov. 28, 2008    (EP) .................................... 08170309

(51) Int. Cl.
*G06Q 20/40* (2012.01)
*G06K 19/07* (2006.01)
(Continued)

(52) U.S. Cl.
CPC ............ *G07F 7/1008* (2013.01); *G06K 19/077* (2013.01); *G06K 19/0718* (2013.01);
(Continued)

(58) Field of Classification Search
CPC . G06K 7/0013; G06K 7/0021; G06K 7/0026; G06K 7/003; G06K 7/0047; G06K 7/0056; G06K 7/006; G06K 9/00006; G06K 19/0716; G06K 19/0718; G06K 19/07; G06K 19/07707; G06K 19/07743; G06Q 20/206; G06Q 20/341; G06Q 20/4012; G06Q 20/4014; G06Q 20/40145

USPC ......... 235/492, 379, 380, 486, 382, 441, 487, 235/451; 705/35, 39, 41, 42, 44, 65, 67, 72, 705/75, 17, 18; 382/115, 116, 119, 124; 455/556.1, 557, 558, 559, 410, 411, 455/66.1, 41.1; 340/5.4, 5.41, 5.42, 5.51, 340/5.52, 5.53, 5.54, 5.8, 5.81, 5.82, 5.83, 340/5.84, 5.85; 713/172, 182–186
See application file for complete search history.

(56) References Cited

U.S. PATENT DOCUMENTS 5,590,038 A * 12/1996 Pitroda ........................... 705/41
5,802,325 A     9/1998 Le Roux
(Continued)

FOREIGN PATENT DOCUMENTS

| EP | 0 649 547 B1 | 6/1997 |
| EP | 0 980 053 A2 | 2/2000 |
| WO | WO 2008080879 A1 * | 7/2008 |

OTHER PUBLICATIONS

International Search Report (PCT/ISA/210) issued on Mar. 31. 2010, by European Patent Office as the International Searching Authority for International Application No. PCT/EP2009/066034.

*Primary Examiner* — Michael G Lee
*Assistant Examiner* — Suezu Ellis
(74) *Attorney, Agent, or Firm* — Buchanan Ingersoll & Rooney PC

(57) ABSTRACT

A smart portable object including a safety component and a display, wherein the display is directly or indirectly interactive between a user and the safety component. The smart portable object also relates to implementing an electronic transaction, including a display step for displaying all or some of the information that is useful to a user for the transaction and/or a step of interacting with the user, wherein the display and/or interaction step is carried out via the interactive display.

18 Claims, 3 Drawing Sheets

(51) Int. Cl.
  *G07F 7/10* (2006.01)
  *G06Q 20/34* (2012.01)
  *G06K 19/077* (2006.01)
  *G06Q 20/12* (2012.01)
  *G07F 7/08* (2006.01)

(52) U.S. Cl.
  CPC .... *G06K19/07703* (2013.01); *G06K 19/07707* (2013.01); *G06Q 20/12* (2013.01); *G06Q 20/341* (2013.01); *G06Q 20/4012* (2013.01); *G06Q 20/40145* (2013.01); *G07F 7/0806* (2013.01)

(56) References Cited

U.S. PATENT DOCUMENTS

| | | | | |
|---|---|---|---|---|
| 6,234,389 B1 * | 5/2001 | Valliani et al. | | 235/380 |
| 6,257,487 B1 * | 7/2001 | Hayashida | | 235/380 |
| 6,512,840 B1 * | 1/2003 | Tognazzini | | 382/119 |
| 6,547,130 B1 * | 4/2003 | Shen | | 235/380 |
| 6,616,035 B2 * | 9/2003 | Ehrensvard et al. | | 235/380 |
| 6,760,014 B1 * | 7/2004 | Liberman | | 345/169 |
| 6,915,957 B2 * | 7/2005 | Kisliakov | | 235/492 |
| 7,440,771 B2 * | 10/2008 | Purk | | 455/556.1 |
| 7,802,728 B2 * | 9/2010 | Kisliakov | | 235/492 |
| 8,820,638 B1 * | 9/2014 | Cotter et al. | | 235/380 |
| 2002/0077974 A1 * | 6/2002 | Ortiz | | 705/39 |
| 2002/0178124 A1 * | 11/2002 | Lewis | | 705/67 |
| 2002/0180584 A1 * | 12/2002 | McGregor et al. | | 340/5.26 |
| 2004/0235450 A1 * | 11/2004 | Rosenberg | | 455/406 |
| 2006/0131393 A1 | 6/2006 | Cok et al. | | |
| 2007/0027804 A1 | 2/2007 | Vega | | |
| 2007/0158408 A1 * | 7/2007 | Wang et al. | | 235/380 |
| 2008/0110977 A1 * | 5/2008 | Bonalle et al. | | 235/380 |
| 2008/0126260 A1 * | 5/2008 | Cox et al. | | 705/67 |
| 2008/0223925 A1 * | 9/2008 | Saito et al. | | 235/380 |
| 2009/0173784 A1 * | 7/2009 | Yang | | 235/380 |
| 2009/0307132 A1 * | 12/2009 | Phillips | | 705/41 |
| 2010/0170942 A1 * | 7/2010 | Lo Iacono | | 235/375 |
| 2011/0140841 A1 * | 6/2011 | Bona et al. | | 340/5.83 |

* cited by examiner

PORTABLE OBJECT INCLUDING A DISPLAY AND APPLICATION FOR CARRYING OUT ELECTRONIC TRANSACTIONS

The invention concerns a portable object comprising a display, use thereof for implementing steps in an electronic transaction method and the associated system.

In particular, the invention applies to the implementation of secure electronic transactions such as payments by means of a protected portable object such as a chip card, USB key, etc. The payments may be local by means of payment terminals or online on the Internet in relation to merchant sites and servers or a distant or local associated processing unit. The object is in the form of a chip card in a preferred embodiment.

Although described in relation to an example financial transaction, the term transaction designates here any bidirectional exchange between the portable object and the processing unit, for example a consultation of a database or a secure personal base, access to shared files, downloading, access control, processing of data of the monetary type such as transfers of funds, etc.

Such portable objects are known among chip cards for displaying in particular transaction balances, the content of a memory or an OTP (One Time Password) number. Such cards may be self-contained and have a battery and a button for actuating the generation of the OTP. Some cards contain a display of the OLED type for presenting alphanumeric information.

Electronic labels for supermarkets or window displays are also known, comprising a display and an interface capable of receiving in particular price and updating information by radio-frequency communication with a central data loading unit.

Communicating portable equipment is also known such as personal assistant devices and telephones (PDA Phones) comprising sensitive displays, such as iPhones from the Apple company.

Bank terminals are also known reading chip cards and those with a magnetic strip, capable of performing an electronic transaction. Such terminals are liable to have Trojan horses and do not have sufficient guarantee and safety for a user.

To protect transactions, recourse is had to online transactions in accordance with the EMV standard (e.g. Mastercard EMV-CAP). Currently there exist three domain authentication models (3-D protected by Visa, secureCode by Mastercard, or J/secure by JCB International).

However, online transactions are more complex than transactions in shops since it is necessary to enter more data.

The object of the invention is to solve the aforementioned drawbacks.

The present invention proposes in principle a portable object the structure of which makes such frauds more difficult in transactions with payment terminals, as well as a novel transaction scheme using this portable object.

According to the invention, the portable object comprises an interactive screen able to display at least some of the data useful to the transaction. Thus the data entered by the user can be sent directly from the trustworthy portable object to a trustworthy processing unit, in particular to a body issuing the object or accrediting it. Likewise, the data sent from the trustworthy processing unit can be received directly by the portable object and presented with confidence under the control of the object.

To this end, the invention concerns an intelligent portable object comprising a security component and an interactive display; it is characterised in that it is able to perform interactive transactions with a distant unit such as a bank, through the interactive display and under the direct or indirect control of a security component.

The data typed by the user on the screen are received and decoded by a secure graphical controller and/or a chip comprising a secure controller and/or using security operations.

Thus the interactive display, for example touch sensitive, makes it possible to perform the transaction directly between the chip card and a processing unit, making fraudulent attacks more difficult and thus improving security. Where applicable, a secure communication protocol, in particular enciphered, can be shared between the processor of the object and the processing unit.

The user can thus dialogue with his portable object in complete confidence directly. The object has the advantage of dispensing with a keypad or other man/machine interface and offers a larger useful display surface or makes it possible to make the object smaller, for example to the Mini UICC or Mini SIM format while incorporating a man/machine interface MMI.

In the case of a card, the use of a reader of the transparent type of the applicant, illustrated in the figures, or a radio-frequency reader not covering the card or the object, makes the surface of the object where the interactive screen is situated visible and accessible.

Interactivity can be obtained for example by pressure or other sensors, capacitive, resistive or magnetic, placed behind or combined with a flexible screen.

According to other features, the portable object comprises, alone or combined:
- an interface for communication with a terminal, this being able to be an interface of any nature, contact or radio frequency, or even for example simple electrical connectors for a connection of the ohmic type with a terminal port;
- communication means able to establish communication with a distant processing unit and/or to display information coming from the distant processing unit;
- the portable object is able to make data entered on the screen transit to a distant unit;
- it is able to interact directly via the screen with a user;
- it comprises a program or protocol for displaying data of a transaction coming from the distant unit for approval and/or checking by interaction on a zone displayed on the screen;
- it comprises a program or protocol for displaying at least one payment mode and transmitting a mode selected by interaction on a zone displayed on the screen;
- it comprises a program for displaying at least one interactive keypad for entering a PIN code and transmitting the selected PIN code for verification by interaction with the zones displayed on the screen;
- it comprises a program capable of displaying at least one writing zone and transmitting, for verification, parameters for entering the writing by interaction with the screen.

Another subject of the invention is a method (and corresponding system) for performing an electronic transaction comprising an exchange of data between a distant processing unit and a portable object, the unit being connected to the portable object, said method using:
- a display step for presenting all or some of the information useful to the transaction to a user,
- and/or a step of interaction with the user, characterised in that the portable object used is in accordance with one of the preceding claims and in that the display step and/or the interaction are performed via said interactive display.

The system comprises a card reader that is arranged with respect to the card so as to leave the interactive display usable (accessible) and visible to the user once placed in the communication position in the reader.

By virtue of the invention, the bank terminals can be replaced by any conventional card reader since the transaction takes place directly between the chip card and the banking organisation issuing the card. If necessary the reader can be a simple connector without electronics or without implementing a software interface.

It also allows convergence of all payment systems via internet whether the purchases/transactions be performed in a shop or online via the internet once the merchant has obtained the identification data of his financial institution or secure payment gateway. In addition, the method based on a transaction model based on the internet avoids any telephone communication costs.

By virtue of the card reader connected to the computer, the user can now have the same online transaction experience as if he were making a local transaction in the shop without needing to enter his card number or other information required by current online merchants.

An important advantage of the invention is that the identity of the purchaser and the payment method are known solely to the user and the issuing bank. The only information known to the payment gateway and the merchant are the issuing bank and confirmation of the amount of the transaction.

The customer can use one or more payment methods in the same transaction in the case in particular where an account is insufficiently provisioned.

Other particularities and advantages of the invention will emerge from a reading of the description given by way of non-limitative example and with regard to the accompanying drawings, in which.

Figure 1:
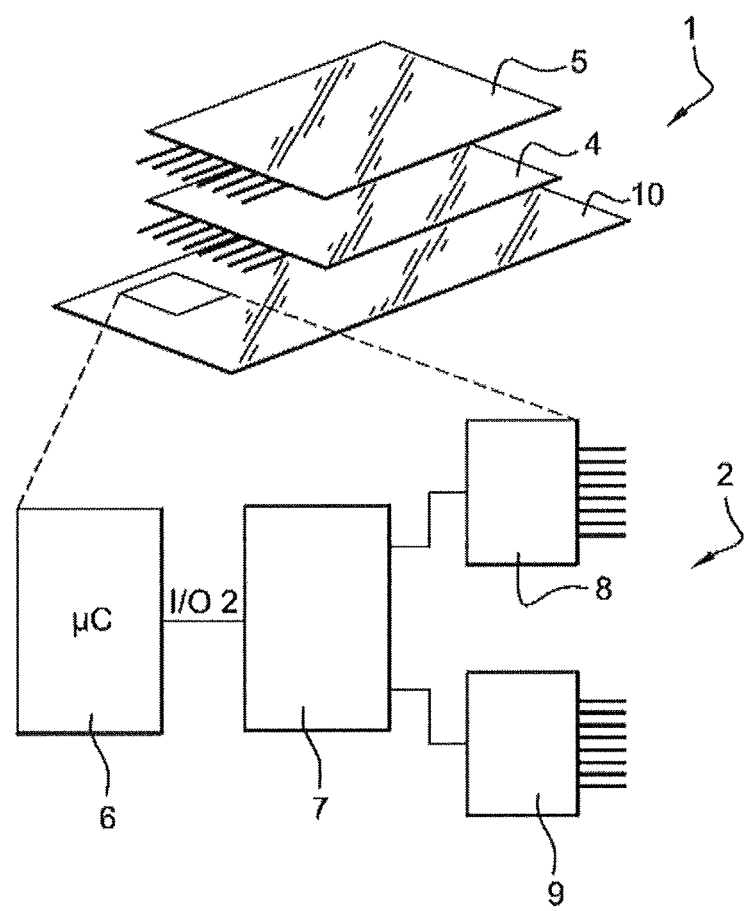
FIG. 1 illustrates schematically the structure of a portable object in accordance with the invention.

In FIG. 1, the portable object used for describing an example embodiment is a chip card 1 in particular to the ISO 7816 format; however, it could be any intelligent portable object with a microcircuit such as a USB key or card to other PCMCIA or MMC formats. The microcircuit preferably has security functions particular to chip cards (physical and/or logic protections, for example enciphering key, anti-intrusion means, authentication, production of certificate, generation of random data, scrambling of data, etc); it is housed here in a module with electrical contacts 2 but could have other communication interfaces or functions such as a contactless function, in particular radio frequency RFID in accordance with ISO 14443. The portable object is in principle intended to communicate with a communication terminal directly or by means of an associated connector and/or reader. The microcircuit may be in a card connected to an object or soldered to an electronic circuit of the object.

Since the electronic paper or OLED layer could be translucent, in particular when there is no current, layers 4 and/or 5 or 10 could comprise security elements such as logos, graphics and holograms printed under these layers in a conventional manner in order to increase security of the card or object. These security elements can be achieved by other means such as personalisation laser. Thus the card can comprise, on a face or visible by transparency of the layers, all the necessary conventional graphical protection elements.

In a variant embodiment, the object can function in independent mode by itself without communicating with the terminal; in particular, it can be made to fulfil functions of consultations of an internal memory, or generation of an OTP number, other entry or backup functions, or as a calculator.

In the case of a USB key, the key can be fitted in a communication terminal, PC, PDA, portable telephone etc port. In the example, the card is connected to the terminal by means of an ISO card reader.

The chip card format is preferred in particular for reasons of security and portability of the card and other possible parallel uses: prepaid or loyalty card, etc.

The object comprises or is connected to a display (screen), preferably graphical, but could simply be of the alphanumeric type.

According to one feature of the invention, the display is interactive. The interactivity of the screen can be obtained for example by pressure or other sensors, capacitive, resistive or magnetic, placed behind or combined with the screen, preferably flexible.

In the example, use is preferably made of a display sensitive to the touch of a finger or other associated utensil, stylus or pen.

The display comprises in the example a display layer 4 of the electronic paper (OLED) type combined with a sensitive or touch layer 5.

The display preferably extends over a surface of around ⅓ or ½ of the surface of the card on a surface portion and comprises a distant zone of the module to allow visibility of the card when it is inserted in the connector.

Figure 2:
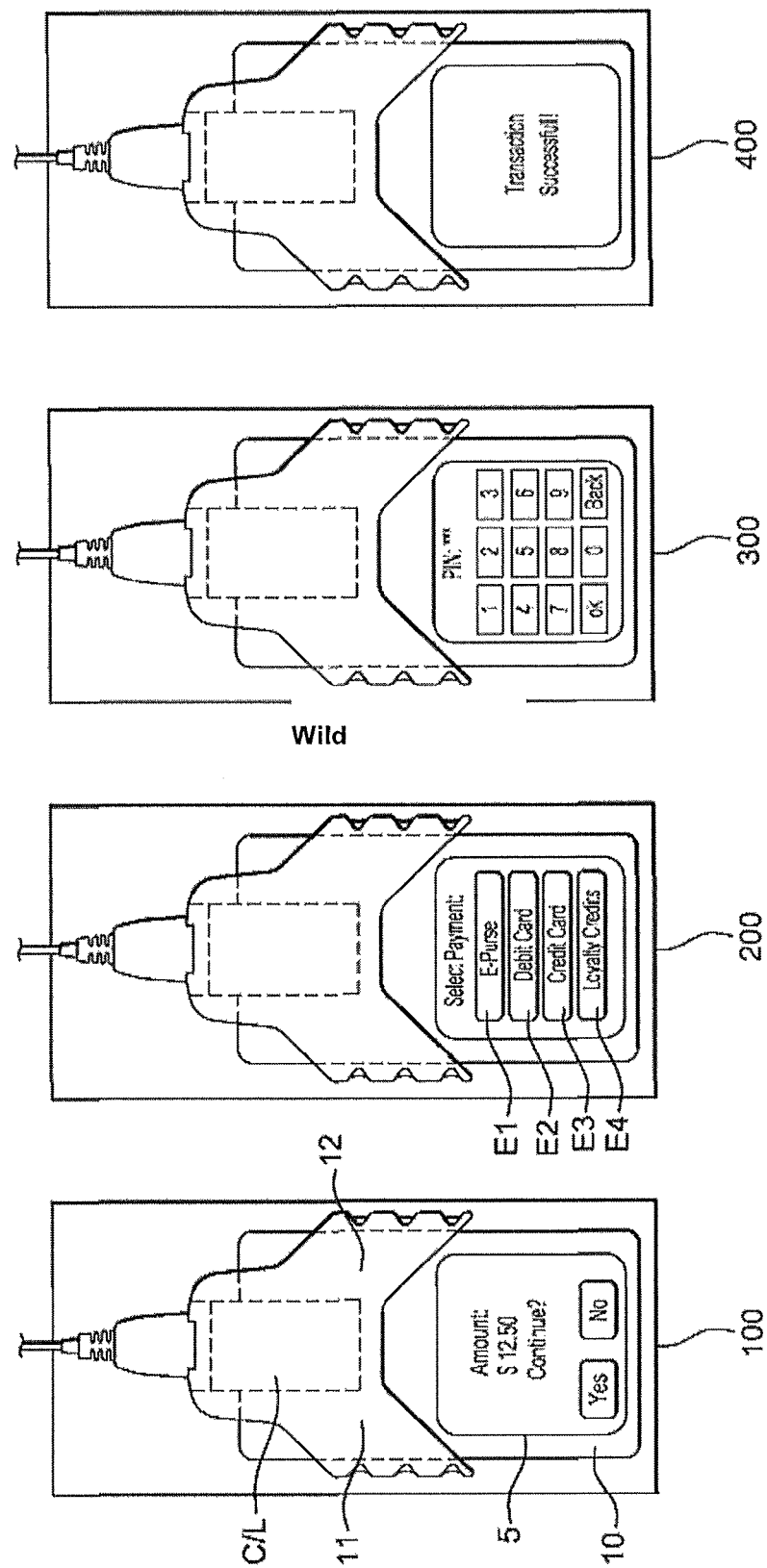
FIG. 2 illustrates schematically a use of the object according to the invention using a connector/reader.

Advantageously the connector C/L associated with the card is arranged structurally so as to allow interaction of the user with the interactive display. Here the reader comprises arms 11, 12 scalloped in a "V" (FIG. 2). The display is therefore not covered by the connector casing. The reader is also arranged with respect to the card so as to leave the interactive display of the card accessible and visible to the user once placed in the communication position in the reader.

However, the display could cover almost all or all of this surface. Any connector with electrical contacts can be located preferably on the same side as the display but could be placed on the opposite face in order to gain surface area.

The object is able to interact directly via the screen with a user.

The two layers are connected respectively in a known manner to electronic means or microcircuits 2 able to fulfil functions of presentation of information to a user and to interactively receive interactions of the user, in particular by pressing on the touch layer 5.

The electronic means comprise in the example a first standard chip card microcontroller 6 connected to at least a second microcontroller 7 of the sensitive screen and/or of the graphical screen by a connection I/O2 to the second serial port of the microcontroller of the chip card, the first port being used for communication via the contacts, in particular ISO 7812-2). The second microcontroller 7 controls respectively the two layers by means of an address decoder or interface 8, 9.

Physically, it is possible to have one chip per microcontroller, connected together to one another and housed together in a chip card module. Where applicable, all the functions described above can be integrated in a single component or distributed through several components positioned and embedded in the plastic body 10 of the chip card in accordance with a multi-component chip card technology in which the components are connected by electrical tracks implemented on a flexible substrate, in particular by etching or screen printing or inkjet, etc.

Preferably interaction with the user takes place directly or indirectly between the screen and a security component. In the example, the data goes to the security component 6 via the graphical and/or touch controller 7, which can also be protected.

The data goes directly into a security component or pass where applicable through a component preferably also protected. There may exist a mutual or reciprocal authentication procedure between the two components in order to avoid for example chip substitution.

In a variant embodiment, the card may be a card of the PCMCIA or other type and comprise a shared memory directly accessible to a host processing unit and to a microcontroller of the card. The data to be exchanged with the host and then a distant unit pass through this memory. Functioning such as that of the input/output communication device described in patent EP 0 649 547 can be adopted in order to implement the invention, wherein the display and screen can be considered to be an input/output interface.

The selections on the screen are perceived and decoded or interpreted by the microcontroller 7. For example, a PIN code typed optionally in accordance with a logic known to the user and shared by the microcontroller 7 is deduced by the microcontroller. The microcontroller 7 optionally transposes the signals perceived into data representing the PIN code.

These data are next compared either in the same secure component or transmitted to another secure component 6 for comparison or transmission to an external device (bank server) for comparison with a pre-recorded PIN code.

The data representing the PIN code are communicated to the component 7, where applicable using a security mechanism (enciphering, etc).

For functioning thereof the portable object comprises functions and/or means described below in a cumulative or isolated manner.

According to another feature, the portable object comprises communication means able to establish communication with a distant processing unit and/or to display information coming from the distant processing unit. The card comprises in particular means for establishing a communication on the internet directly or indirectly via the terminal. In the example, the internet IP protocol is integrated therein and direct communication is available on the internet by means of the terminal, the latter becoming transparent or acting as a modem by implementing just the physical communication interface between the network and the card.

According to one feature, the card is able to make the data entered on the screen transit to the distant unit. In particular, the data entered are interpreted and/or decoded by the second controller with its decoder and transmitted to the first controller in order to be conveyed over the internet to a distant unit, which may be a server of a merchant site. An interpretation program P2 and a transfer program P3 for the entered data are present in the second microcontroller 7 or distributed between the two 7, 8.

According to other features, the card comprises a program or protocol P4 for displaying data of a transaction coming from the distant unit for approval and/or checking by interaction on a zone displayed on the screen.

According to other features, the card comprises a program or protocol P5 for displaying at least one payment method and transmitting a method selected by interaction on a zone displayed on the screen.

It comprises a PIN program P6 for displaying at least one interactive keypad for entering a PIN code and transmitting for verification the PIN code selected by interaction with the zones displayed on the screen.

The verification can be made preferably by an official distant server (bank, etc) but may take place in the card in a more conventional manner. In the latter case, the terminal receives the response from the card or a certificate for performing the transaction. Preferably, the card validates the PIN itself for pre-validation before transmitting to the bank. It should be noted that software for processing a change of PIN with synchronisation with the bank can also be envisaged as an option.

The card comprises a program P7 for biometric entry such as handwriting or a signature. The signature can be done on the touch screen with a pen. In particular, the program is able to display at least one writing zone on the screen and to transmit for verification writing entry parameters by interaction with the screen. The card can also for this purpose comprise means of analysing and diagnosing entered data, for example a comparison or calculation of the dynamics of the signature. Where applicable, a biometric and/or fingerprint sensor can be associated with the surface of the card or alongside the touch screen; these data may supplement a PIN code entry or constitute the data to be verified for the transaction. The card can comprise a program for static recognition of a signature and/or dynamic writing of a signature on a sensitive screen.

Use of the object according to the invention is now described in relation to FIG. 2, which illustrates the method and/or system for performing an electronic transaction comprising an exchange of data between a distant processing unit connected to a portable object.

The method uses a display step for presenting all or some of the information useful to the transaction to a user and/or a step of interaction and/or validation of the user. Although it is preferable to perform these operations by means of the interactive display of the invention, the invention makes it possible to use this interactive display for performing all or part of at least the display step and at least that of the secure interaction. Thus, for example, confirmation of the amount and/or selection of the method could always be performed on a keypad other than that of the card. The various steps and interactions could be distributed between the card and the system (PC screen, PC keyboard or keypad of the display of the POS terminal).

In order to make a transaction on the internet, the user connects to a communication network such as the internet with his PC computer and selects on a merchant site a product or service to be purchased. The PC comprises a chip card interface implemented here by a connector or reader C/L. The connector can be connected also by a USB cable to the PC and the communication and USB function can be implemented either by the card itself or by an ISO/USB adaptation function of the reader.

During the transaction or before, the user introduces his card into an adapted connector connected to the terminal and the data and operations necessary to the transaction are then performed between the card and the network. The user can be invited to introduce his card by a message sent or conveyed from the merchant site and displayed on the screen of the PC as if it were in particular a supermarket till.

The user introduces his card, which is then detected by the PC, and communication can be switched directly between the card and the network via the terminal connections. In the contrary case, communication can be made via the PC as a logic and physical interface that relays the communications to the card.

The payment gateway has previously made a request to the bank of the customer, which next establishes communication with the card in order to perform a secure transaction as if the card were in a portable payment reader POS.

This is then a secure communication C5, the establishment of which is described subsequently, between the card and the issuing bank of the customer.

Next payment itself is made in the following manner:

At step 100, the merchant site having communicated to the bank (in particular through a request for payment to a payment gateway 16 explained below) the data of the transaction to the card, for example an amount of $12.50, the bank displays the amount of this information by means of a display command intended for the card and including the amount to be displayed as data linked to the order.

The questions "continue" and two replies "yes", "no" within or facing two distinct interactive windows of the sensitive display are also displayed either at the initiative of the bank by means of a command equivalent to the previous one or at the initiative of the card, which comprises a program able to display these questions triggered by the reception of the preceding command.

At step 200, the user having selected "yes", a corresponding signal is picked up by the card controller and returned to the bank.

The bank then causes to be displayed or conveyed to the card a menu for selecting the payment method comprising for example: by electronic purse, debit card, credit card or loyalty points credit card. These options are displayed in interactive zones respectively E1, E2, E3, E4 of the interactive layer opposite the display.

Alternatively, the initiative may come from the card, which in advance comprises a list of the payment possibilities offered to the user and triggers itself by means of a suitable application program executed by the microcontroller of the card in response to the selection of the reply "yes".

Once selected, the loyalty points zone is detected by the merchant site, which returns a PIN code entry keypad with interactive keys. The keypad is preferably scrambled or enciphered and deciphered in the card.

Alternatively, the initiative for the display of a PIN code may come from the card by means of a program that displays a PIN code, optionally modified at each display in accordance with a sequence known to the user. The display is triggered in response to the previous selection of the payment method captured by the card.

Stars are displayed on the screen each time the number is entered and a validation on "OK" triggers the sending of the PIN code over the network to the bank, this preferably being performed in enciphered form by means of enciphering keys previously loaded or generated and algorithms for enciphering and/or verifying the card certificate.

Alternatively, the card itself receives the PIN code and checks it itself, and then communicates a positive result of the check preferably in enciphered form to the bank or with an associated certificate.

At step 400, the bank of the customer has checked the PIN received, which it has, where applicable, previously deciphered and displays information indicating the success of the transaction destined for the card also in the form of a display command, and the bank then proceeds with the payment.

Alternatively, the card has checked the PIN code internally and communicates, preferably in enciphered form, the positive result of the comparison of the PIN code typed to the bank, which locally deciphers and proceeds with payment.

Next, payment confirmation messages take place between the bank and the payment gateway (see connection C6, C7), which informs the merchant server of this, and a transfer of funds and finalisation of the transaction takes place from the bank of the customer to that of the merchant.

Figure 3:
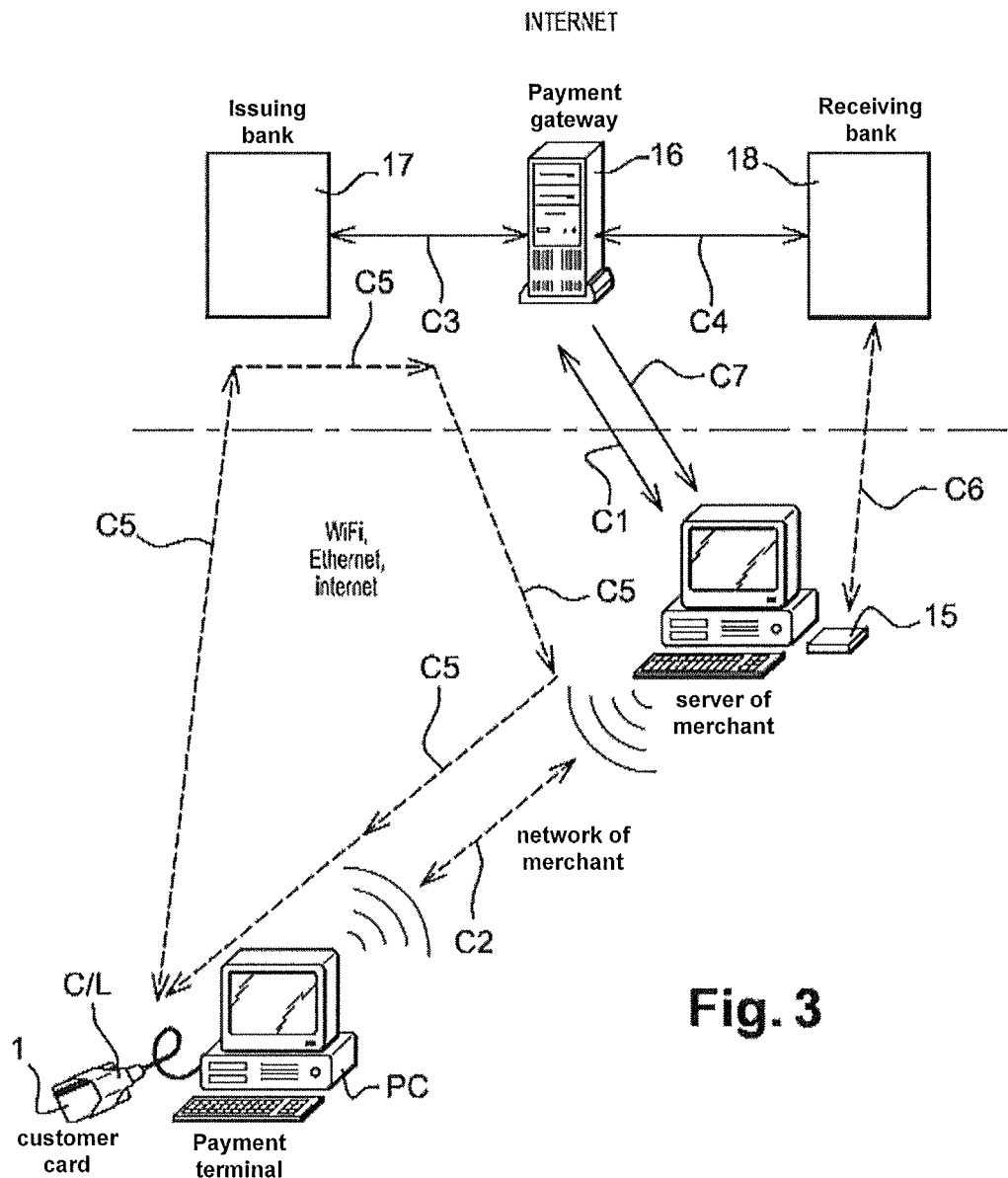
FIG. 3 illustrates schematically the network of the merchant site for using the invention according to one embodiment.

FIG. 3 illustrates schematically the network of the merchant site for using the invention in accordance with one embodiment.

By simplification, the payment gateway also acts as a certification authority.

For online transactions, the payment terminal may be a PC connected via an internet connection.

In the case of reimbursement, the server of the issuing bank and the server of the debiting bank are switched.

The system of the invention comprises the PC terminal connected to the card in order to connect to a distant processing unit 15, 16 such as a merchant server 15 via any network such as WiFi, Ethernet, internet 15, 17 and/or an issuing bank of the user 17. These units 15, 17 are able to use a communication protocol and/or set of commands with the portable object allowing the display and/or recovery of the data entered on the screen directly and/or after processing and/or checking by the portable object.

The merchant server 15 is in communication relationship with a receiving bank 18 on the one hand and a payment gateway 16 on the other hand. The payment gateway 16 is in relationship with the bank of the customer 17 and the bank 18 of the merchant.

The steps are as follows:

C1: A secure communication C1 such as of the TSL/SSL type is established between the merchant server 15 and the payment gateway 16;

C2: The amount of the transaction, the identity of the server, the identity of the issuing bank and the identity of the server of the receiving bank are enciphered and transmitted C2 to the payment gateway 16 using the public key of the payment gateway;

C3: A secure communication C3 such as that of the TSL/SSL type is established between the payment gateway 16 and the merchant server of the issuing bank 17;

C4: A secure communication C4 such as of the TSL/SSL type is also established between the merchant server 15 and the server of the receiving bank 18;

C5: A secure connection C5 is established between the issuing bank and the card (see below for details), confirmation of withdrawal returned to the payment gateway via the payment gateway and merchant server or directly via the PC;

C6: A secure connection C6 is established between the receiving bank and the card of the merchant, confirmation of deposit returned to the payment gateway 16;

C7: A transaction confirmation number is returned to the merchant (and consequently also to the card of the customer).

The following elements should preferably be injected in accordance with an example embodiment, in the customer card during a personalisation (or when the card is issued) in order to protect the transaction in particular between the issuing bank and the card of the customer.

IDcc=identifier of the customer card

CERTca=CA certificate

CERTcc=certificate of customer card (expiry date) with Pukcc=public key of customer card PrKcc=parts of the private key of the customer card (P, Q, PQ, DP exponent and DQ exponent)

Skcc=secret key of the customer card shared with the issuing bank.

The bank (or equivalent server) for its part also comprises means for enciphering the data sent to the card and deciphering the data received from the card.

The bank (or equivalent server) also comprises means for producing a certificate for the card or checking a certificate received from the card.

According to other alternative or complementary features, once the secure connection has been established between the card and the bank issuing the card, the latter can offer, via the displayable interface of the card, the various types of payment available.

The card can communicate directly with the bank interactively. For this purpose, a set of commands and/or protocols are shared between the card and the bank. Messages from the bank to the card are transmitted directly and vice versa, where applicable encapsulated in a communication protocol of the network.

The card comprises where applicable another protocol and set of commands particular to the issuing bank, triggered once the communication is established between the card and the bank. The reader is able to encapsulate/de-encapsulate the commands and data coming from the card and vice versa.

The menus and types of transaction are conveyed interactively from the bank to the card. In other words, the types of payment available in agreement with the profile of the customer (e.g.: bank account 1, bank account 2, credit account 1, credit margin, etc) are offered or proposed directly by the bank with the amounts (balance) available on these accounts (e.g.: bank account 1 at €2000, bank account 2 at €1500, balance of credit account 1 at €500, etc). The invention makes it possible to make a payment distributed over several accounts according to the credit available on each account or at the choice of the customer.

The invention claimed is:

1. An intelligent portable object comprising a security component and an interactive display, and configured to make interactive transactions with a remote unit, through the interactive display and under direct or indirect control of the security component,
   wherein the intelligent portable object is further configured to:
   receive a personal identification number (PIN) code or biometric data directly in the portable object while physically connected to a terminal that is in communication with the remote unit,
   authorize a transaction by verifying the personal identification number (PIN) code or biometric data by the security component in the portable object while connected to the terminal, and
   receive information useful to the transaction from the remote unit through the terminal, and display the information on the interactive display, while connected to the terminal,
   wherein (i) the portable object comprises a chip card and (ii) the chip card uses at least one of a communication protocol and a set of commands shared with the remote unit in order to communicate directly with the remote unit.

2. The portable object according to claim 1, wherein the portable object includes an interface for communication with the terminal.

3. The portable object according to claim 1, wherein the portable object includes at least one of a physical interface and a programmed communication interface configured to establish a communication with the remote unit or to display information coming from the remote unit.

4. The portable object according to claim 1, wherein the portable object is configured to make data entered on the interactive display pass to the remote unit.

5. The portable object according to claim 1, wherein the portable object includes a program or protocol for displaying data of a transaction coming from the remote unit for at least one of approval and checking by a user by interaction on a zone displayed on the interactive display.

6. The portable object according to claim 1, wherein the portable object includes a program or protocol for displaying at least one payment method and transmitting a method selected by interaction of a user on a zone displayed on the interactive display.

7. The portable object according to claim 1, wherein the portable object includes a program for displaying at least one interactive keypad for entering the personal identification number (PIN) code by interaction of a user with zones displayed on the interactive display.

8. The portable object according to claim 1, wherein the portable object includes at least one of a static and dynamic character recognition or biometric entry program capable of displaying at least one writing zone.

9. The intelligent portable object of claim 1, wherein the intelligent portable object is further configured to:
   receive the personal identification number (PIN) code or the biometric data directly on the interactive display while connected to the terminal that is in communication with the remote unit.

10. The portable object according to claim 1, wherein the security component is configured to verify the personal identification number (PIN) code or the biometric data by comparing the PIN code or the biometric data to a stored PIN code or stored biometric data within the portable object, or securely transmit the PIN code or the biometric data to the remote unit for verification by the remote unit.

11. A method for performing an electronic transaction comprising an exchange of data between a remote processing unit and a portable object, comprising a security component and an interactive display, configured to make interactive transactions with the remote processing unit, through the interactive display and under direct or indirect control of the security component, said method comprising the steps of:
   displaying, by the interactive display, all or some information useful to the transaction to a user,
   interacting with the user, wherein the displaying and the interaction are performed via said interactive display,
   receiving a personal identification number (PIN) code or biometric data directly in the portable object while physically connected to a terminal that is in communication with the remote processing unit,
   authorizing a transaction by verifying the personal identification number (PIN) code or biometric data by the security component in the portable object while connected to the terminal,
   receiving information useful to the transaction from the remote processing unit through the terminal, and
   displaying the information received from the remote processing unit on the interactive display, while the portable object is connected to the terminal,
   wherein (i) the portable object comprises a chip card and (ii) the chip card uses at least one of a communication protocol and a set of commands shared with the remote processing unit in order to communicate directly with the remote processing unit.

12. The method of claim 11, wherein the receiving the personal identification number (PIN) code or the biometric data is received directly on the interactive display while connected to the terminal that is in communication with the remote processing unit.

13. The method of claim 11, further comprising verifying, by the security component, the personal identification number (PIN) code or the biometric data by comparing the PIN code or the biometric data to a stored PIN code or stored biometric data within the portable object, or securely transmitting the PIN code or the biometric data to the remote processing unit for verification by the remote processing unit.

14. A system for performing an electronic transaction including a bidirectional data exchange between a remote processing unit and a portable object, said system comprising:
- a terminal configured to communicate with the portable object;
- the remote processing unit; and
- the portable object, comprising a security component and an interactive display, and configured to:
  - receive a personal identification number (PIN) code or biometric data directly in the portable object while the portable object is physically connected to the terminal, wherein the terminal is in communication with the remote processing unit,
  - authorize a transaction by verifying the personal identification number (PIN) code or biometric data by the security component in the portable object while the portable object is connected to the terminal, and
  - make interactive transactions with the remote processing unit, through the interactive display and under direct or indirect control of the security component, wherein the interactive display is further configured to receive information useful to the transaction from the remote processing unit through the terminal, and display the information on the interactive display, while the portable object is connected to the terminal, and
  - wherein the displaying of information and an interaction with a user are performed via said interactive display,
- wherein (i) the portable object comprises a chip card and (ii) the chip card uses at least one of a communication protocol and a set of commands shared with the remote processing unit in order to communicate directly with the remote processing unit.

15. A system according to claim 14, wherein the remote processing unit is configured to use a communication protocol or a set of commands with the portable object.

16. A system according to claim 14 wherein the terminal is arranged with respect to the portable object so as to leave the interactive display accessible and visible to the user once physically connected to the terminal.

17. The system of claim 14, wherein the portable object is further configured to receive the personal identification number (PIN) code or the biometric data directly on the interactive display while the portable object is connected to the terminal, wherein the terminal is in communication with the remote processing unit.

18. The system of claim 14, wherein the security component is configured to verify the personal identification number (PIN) code or the biometric data by comparing the PIN code or the biometric data to a stored PIN code or stored biometric data within the portable object, or securely transmit the PIN code or the biometric data to the remote processing unit for verification by the remote processing unit.

* * * * *